United States Patent
Zhang et al.

(10) Patent No.: US 10,696,771 B2
(45) Date of Patent: Jun. 30, 2020

(54) METHOD OF INCORPORATING ETHYLENE COPOLYMERS INTO LATEX

(71) Applicant: Performance Materials NA, Inc., Midland, MI (US)

(72) Inventors: David D Zhang, Wilmington, DE (US); David M Dean, West Chester, PA (US); Elizabeth R Griffin, Newark, DE (US); Richard Allen Hayes, Beaumont, TX (US); Donna Lynn Visioli, Lower Gwynedd, PA (US)

(73) Assignee: Performance Materials NA, Inc., Midland, MI (US)

( * ) Notice: Subject to any disclaimer, the term of this patent is extended or adjusted under 35 U.S.C. 154(b) by 16 days.

(21) Appl. No.: 15/082,230

(22) Filed: Mar. 28, 2016

(65) Prior Publication Data

US 2016/0280905 A1 Sep. 29, 2016

Related U.S. Application Data

(60) Provisional application No. 62/138,590, filed on Mar. 26, 2015, provisional application No. 62/192,208, filed on Jul. 14, 2015.

(51) Int. Cl.
*C08F 255/02* (2006.01)
*C09D 151/06* (2006.01)
*C09J 151/06* (2006.01)

(52) U.S. Cl.
CPC ........ *C08F 255/02* (2013.01); *C08F 255/026* (2013.01); *C09D 151/06* (2013.01); *C09J 151/06* (2013.01)

(58) Field of Classification Search
CPC .. C08F 255/02; C08F 255/026; C09D 151/06; C09J 151/06
USPC ........................................................ 524/457
See application file for complete search history.

(56) References Cited

U.S. PATENT DOCUMENTS

| | | | |
|---|---|---|---|
| 2,551,600 A | 5/1951 | Holland et al. | |
| 2,897,183 A | 7/1959 | Christl et al. | |
| 4,011,388 A | 3/1977 | Murphy et al. | |
| 4,070,532 A | 1/1978 | Hammer | |
| 4,230,830 A | 10/1980 | Tanny et al. | |
| 4,346,199 A | 8/1982 | Peng et al. | |
| 4,411,954 A | 10/1983 | Butch, III et al. | |
| 4,460,728 A | 7/1984 | Schmidt, Jr. et al. | |
| 4,526,577 A | 7/1985 | Schmidt, Jr. et al. | |
| 4,879,333 A | 11/1989 | Frazee | |
| 4,929,673 A * | 5/1990 | Laughner ................ C08L 25/12 525/146 |
| 5,028,674 A | 10/1991 | Hatch et al. | |
| 5,071,904 A | 12/1991 | Martin et al. | |
| 5,095,065 A | 3/1992 | Yang | |
| 5,349,026 A | 9/1994 | Emmons et al. | |
| 5,371,148 A | 12/1994 | Taylor et al. | |
| 5,569,715 A | 10/1996 | Grandhee | |
| 5,686,518 A | 11/1997 | Fontenot et al. | |
| 5,728,759 A | 3/1998 | Pike | |
| 5,744,250 A | 4/1998 | Lee et al. | |
| 6,277,910 B1 | 8/2001 | Rassing et al. | |
| 6,299,985 B1 | 10/2001 | Zhang et al. | |
| 6,333,378 B1 | 12/2001 | Clark et al. | |
| 7,396,871 B2 | 7/2008 | Shoaf et al. | |
| 8,399,096 B2 | 3/2013 | Hausmann et al. | |
| 8,841,379 B2 | 9/2014 | Hayes | |
| 8,907,022 B2 | 12/2014 | Hayes et al. | |

FOREIGN PATENT DOCUMENTS

JP 05-287121 A 11/1993
WO 98/42761 A1 10/1998

OTHER PUBLICATIONS

Wang et al., in "Emulsion and Mini-emulsion Copolymerization of Acrylic Monomers in the Presence of Alkyd Resin," Journal of Applied Polymer Science, vol. 60, pp. 2069-2076 (1996).

Yamak, Hale Berber, "Emulsion Polymerization: Effects of Polymerization Variables on the Properties of Vinyl Acetate Based Emulsion Polymers," pp. 35 to 72 (Chapter 2 of Yilmaz, Faris, Ed., "Polymer Science," ISBN 978-953-51-0941-9, 256 pages, Publisher: InTech, Chapters published Jan. 23, 2013 under CC BY 3.0 license, DOI: 10.5772/2749, available at http://cdn.intechopen.com/pdfs-wm/42097.pdf).

* cited by examiner

Primary Examiner — Kelechi C Egwim

(57) ABSTRACT

Provided is a method for preparing a latex composition, comprising providing an ethylene copolymer comprising copolymerized units of ethylene and copolymerized units of at least one polar comonomer; dissolving the ethylene copolymer with one or more latex monomers to prepare a solution; mixing the solution with water; optionally adding a surfactant or protectant colloid to form an aqueous emulsion; and polymerizing the latex monomer in the emulsion to form a latex composition comprising the ethylene copolymer and a latex polymer. Further provided are the emulsion polymerization product and the mini-emulsion polymerization product of at least one ethylene copolymer substantially dissolved in at least one latex monomer, such as an acrylic, styrene or vinyl monomer. Finally, formulated products comprising or produced from the emulsion or mini-emulsion polymerization product and articles comprising or produced from the formulated products are provided.

9 Claims, No Drawings

METHOD OF INCORPORATING ETHYLENE COPOLYMERS INTO LATEX

CROSS-REFERENCES TO RELATED APPLICATIONS

This application claims priority from United States Provisional Application Nos. 62/138,590, filed on Mar. 26, 2015, and 62/192,208, filed on Jul. 14, 2015, each of which is incorporated herein by reference in its entirety.

FIELD OF THE INVENTION

Provided herein is a method for preparing latex compositions modified with ethylene copolymers. Further provided are the emulsion polymerization product and the mini-emulsion polymerization product of at least one ethylene copolymer substantially dissolved in at least one latex monomer, such as an acrylic, styrene or vinyl monomer. Finally, formulated products comprising or produced from the (mini-)emulsion polymerization product and articles comprising or produced from the formulated products are provided.

BACKGROUND OF THE INVENTION

Several patents and publications are cited in this description in order to more fully describe the state of the art to which this invention pertains. The entire disclosure of each of these patents and publications is incorporated by reference herein.

Paints, lacquers, coatings (for paper, carpet backing etc.) and adhesives generally comprise polymers that are dissolved or dispersed in liquids. The polymer-containing liquids are applied to substrates, and the liquid is removed by drying to leave a deposit of the polymeric materials on the substrate. The liquid may be water, an organic solvent, or a combination of water and organic solvent(s). In solvent-based coatings or adhesives, the polymers are dissolved in an organic solvent. In water-based coatings or adhesives, the polymers are dispersed in water.

The organic solvents in paints, lacquers and other products cause a great deal of inconvenience. In recent years, health hazards for professional painters and decorators have been noticed when using such paints daily. Reduction of the amount of volatile organic compounds (VOCs) has also been desirable for environmental reasons, such as ozone layer depletion and greenhouse gas reduction. As a result, the use of water-based paints has grown dramatically in recent years. Because of the relative incompatibility between water and organic based binder systems, it has been difficult to reach a dry-polymeric content above about 60% by weight while maintaining a suitable application viscosity. Thus, a relatively great amount of energy is required for drying and transporting the products. Also, water-based products have generally resulted in surfaces that are more sensitive to scratching and to damage by water. Water-based products sometimes also exhibit poor adhesion to certain substrates due to greater surface tension differences than solvent based counterparts.

Pressure sensitive adhesives are widely used in the adhesive industry. Large quantities of pressure sensitive adhesives (PSAs) are used in the production of masking tape and labels, for example. Conventional PSAs may contain natural rubber or other similar elastomeric compounds.

In response to safety and environmental concerns, the use of water-based PSAs has also grown. Though most water-based PSAs exhibit good shear strength, their solvent-based counterparts exhibit superior shear strength. In addition, natural rubber latex often exhibits poor mechanical stability, which limits the methods by which it can be applied.

U.S. Pat. No. 4,011,388 describes a process for the preparation of aqueous homogeneous polymer emulsion which comprises mixing, generally with agitation or under shear conditions, water, surfactant, at least one polymer, e.g., a cellulosic compound, and at least one monomer, e.g., acrylic, methacrylic, or styrene, the polymer being soluble in the monomer. An aqueous dispersion of polymer-monomer particles is formed. When the monomer within the dispersed particles is polymerized, a substantially homogeneous blend of at least two polymers is formed within the dispersed particles.

U.S. Pat. No. 5,686,518 describes a process for incorporating a polymer that is soluble in one or more monomers into an emulsion polymer. The monomer mix is subjected to high shear to form small droplets in the range of 10 to about 500 nm in diameter. The incorporated polymer level is limited to 0.5-5.0%, based on the combined weight of monomer and polymer. Here, the polymer is used as a co-surfactant.

U.S. Pat. No. 5,071,904 describes a process for incorporating a hydrophobe (greater than 30 weight % based on combined weight of monomer and polymer) into a microparticle. This system requires the use of a functional polymer (e.g., a hydroxyl group) and the use of a cross-linking agent (e.g., melamine formaldehyde or a blocked polyisocyanate).

U.S. Pat. No. 5,569,715 describes a process for forming a hydrophobically modified core polymer as part of a core-shell polymer. The core is made by mixing a hydrophobic polymer, monomer(s), water, and a surfactant, then subjecting the mixture to high shear to form surfactant stabilized particles (droplets) that are between 100 and 300 nm in diameter. This core material is polymerized. A hydrophilic shell is then formed using conventional emulsion polymerization with at least one hydrophilic monomer.

Intl. Patent Appln. Publn. No. WO 98/42761 describes a process for modifying natural rubber by swelling existing natural rubber latex particles with small quantities of vinyl or acrylic monomer, then initiating reaction of the monomer in the swollen latex particles. The process is similar to a seeded emulsion polymer process.

U.S. Pat. No. 4,346,199 describes the use of myrcene to promote grafting of natural rubber latex to alkenyl aromatic and alkenyl nitrile monomers. The grafted and non-grafted portions of the final product are separated and made into sheeting.

U.S. Pat. No. 5,728,579 describes a method for blending various latexes, curing agents, tackifiers, and plasticizers followed by a heated curing step. The product is used in pressure sensitive adhesive applications.

Japanese Patent No. 05287121 describes a process for modifying a natural rubber latex by adding small amounts of acrylic and vinyl monomers plus additional water and surfactant, then polymerizing the acrylic monomers with heat and an initiator. The acrylic monomers are said to graft to the natural rubber forming an acrylic-modified natural rubber latex.

U.S. Pat. No. 5,095,065 describes a process for incorporating a low molecular weight tackifier into a monomer by dissolution, followed by incorporation into a latex under conventional emulsion polymerization conditions.

U.S. Pat. No. 6,333,378 describes water-based latices of an acrylic-modified alkyd or uralkyd resin or hybrid resin which can be prepared by emulsion polymerization as well as by mini-emulsion polymerization.

U.S. Pat. No. 7,396,871 discloses rubber-modified acrylic or vinyl hybrid resins comprising the mini-emulsion polymerization product of at least one rubber compound substantially dissolved in at least one acrylic monomer or vinyl monomer.

U.S. Pat. No. 6,277,910 discloses a water-borne hybrid binder composition obtained by mixing an aqueous dispersion of a polymer, a surfactant and one or more resins that are emulsifiable in water. The selection of the components of the emulsifiable resin and the dispersion respectively is also of great importance for the compatibility of the hybrid system in the paint formulation as well as in the cured film.

Notably, many of these processes start with natural rubber in latex form and do not provide for pre-dissolution of rubber(s) into acrylic and/or vinyl monomer(s), forming of a mini-emulsion, or subsequent polymerization to form a hybrid latex.

Thus, there is a continued need to synthesize new latex compositions that will improve the performance of environmentally benign water-based products, such as paints and adhesives.

SUMMARY OF THE INVENTION

Accordingly, provided herein is a method for preparing a latex composition comprises:
(1) providing at least one ethylene copolymer comprising copolymerized units of ethylene and copolymerized units of at least one polar comonomer, wherein the polar comonomer comprises one or more of a vinyl ester, α,β-unsaturated monocarboxylic acid or its derivative, α,β-unsaturated dicarboxylic acid or its derivative, an epoxide-containing monomer, and carbon monoxide; wherein the ethylene polymer contains 2 to 80 weight % of copolymerized units of the comonomer, based on the total weight of the ethylene copolymer; or wherein the polar comonomer comprises an ionomer of the ethylene copolymer, wherein at least a portion of the copolymerized α,β-unsaturated monocarboxylic acid moieties are neutralized to form carboxylate groups with counterions comprising monovalent or divalent cations;
(2) mixing the ethylene copolymer(s) with one or more latex monomers to form a solution, said latex monomer(s) selected from the group consisting of:
  i) a carboxyl functional monomer such as acrylic acid, methacrylic acid, crotonic acid, itaconic acid, maleic acid, fumaric acid and the like;
  ii) a hydroxyl functional monomer such as 2-hydroxyethyl acrylate, hydroxypropyl acrylate, hydroxybutyl acrylate, 2-hydroxyethyl methacrylate, hydroxypropyl methacrylate, hydroxybutyl methacrylate, allyl alcohol, methallyl alcohol and the like;
  iii) an epoxy functional monomer such as glycidyl methacrylate and the like iv) an amino functional monomer such as acrylamide, methacrylamide, ethyl imidazolidone methacrylate, dimethylaminoethyl methacrylate and the like;
  v) an alkyl acrylate or an alkyl methacrylate such as methyl acrylate, ethyl acrylate, butyl acrylate, 2-ethylhexyl acrylate, stearyl acrylate, methyl methacrylate, ethyl methacrylate, butyl methacrylate, allyl methacrylate, stearyl methacrylate, isobornyl acrylate, isobornyl methacrylate and the like;
  vi) a polymerizable aromatic monomer, such as styrene, alpha-methyl styrene, vinyl toluene, t-butyl styrene, diallyl phthalate and the like;
  vii) a vinyl monomer such as vinyl acetate, vinyl propionate, vinyl versatate, dibutyl maleate and the like; or
  viii) a diene monomer such as butadiene, isoprene and the like; to form a solution of the ethylene copolymer in the latex monomer;
(3) mixing the solution with water;
(4) agitating the mixture of water and solution, optionally with the addition of a surfactant or a protectant colloid, to form an aqueous emulsion; and
(5) polymerizing the latex monomer in the aqueous emulsion to form a latex composition.

The latex composition comprises the ethylene copolymer(s) and a latex polymer, and it may also contain one or more other products of the reaction described in the method.

The latex polymer may be a homopolymer or copolymer. Preferred latex monomers include, without limitation, vinyl esters, alkyl acrylates, alkyl methacrylates, styrenes, and functional monomers such as acrylic acid, methacrylic acid, acrylamide, dimethylaminoethyl methacrylate, glycidyl methacrylate, and allyl methacrylate.

In a preferred method, the aqueous emulsion comprises droplets of the solution having a diameter of about 1 to 10 microns, and the droplets are dispersed in a continuous aqueous phase.

Another preferred method comprises the steps of subjecting the solution to shear forces sufficient to produce an aqueous dispersion that is a mini-emulsion, and polymerizing the latex monomer(s) in the mini-emulsion. The mini-emulsion comprises droplets of the solution having a diameter of about 0.01 to 0.5 microns, and the droplets are dispersed in a continuous aqueous phase.

Still another preferred method comprises the steps of: substantially dissolving at least one ethylene copolymer in at least one latex monomer to form an ethylene copolymer/latex monomer solution; dispersing the ethylene copolymer/latex monomer solution in an aqueous medium to form a pre-emulsion; subjecting the pre-emulsion to shear forces sufficient to produce an aqueous dispersion that is a mini-emulsion; and subsequently polymerizing the mini-emulsion. The mini-emulsion comprises droplets of the solution having a diameter of about 0.01 to 0.5 microns, and the droplets are dispersed in a continuous aqueous phase.

Further provided are a latex composition prepared by the method described above, formulated products comprising or produced from the (mini-) emulsion polymerization product, and articles comprising or produced from the latex composition or the formulated products.

DETAILED DESCRIPTION OF THE INVENTION

Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When the term "about" is used in describing a value or an end-point of a range, the disclosure should be understood to include the specific value or end-point referred to.

Use of "a" or "an" are employed to describe elements and components of the invention. This is done merely for convenience and to give a general sense of the invention. This description should be read to include one or at least one and the singular also includes the plural unless it is obvious that it is meant otherwise.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The term "complementary", as used herein in the context of compositions, refers to amounts that sum to 100%. For example, the sum of the weight percentages of all of the copolymerized comonomers in a copolymer is 100 wt %.

The term "molecular weight" has its usual meaning to denote grams per gram mole of a substance. As applied to polymers herein, "molecular weight" in the absence of further qualification denotes viscosity average molecular weight unless otherwise stated.

The materials, methods, and examples herein are illustrative only and, except as specifically stated, are not intended to be limiting.

As used herein, the term "water-based" refers to latices and emulsions in which water is the medium or the continuous phase.

As used herein, the terms "dissolve," "dissolving" and related terms refer to a process in which solid particles such as pellets of polymer are mixed with liquid and over a brief period of time and under certain temperature disappear into the liquid phase. The term "solution" describes a free-flowing liquid which contains a solvent and a dissolved material and in which no solids are visible to the human eye. No characterization is made regarding the interaction of the dissolved molecules with each other or with the liquid molecules in such solutions.

Blends of high molecular weight polymers with other polymers, oils or liquid monomers can be characterized by their level of compatibility. The first category includes blends that are compatible in the purest sense, i.e. on a molecular level. The terms "miscible blend," "miscibility," and the like have been used for highly compatible polymer blends and are defined in *Polymer-Polymer Miscibility*, O. Olabisi, L. Robeson and M. Shaw, Academic Press (1979). As a general definition, a highly compatible or miscible blend of a two-component system forms a homogeneous system with a single phase. In other words, the polymer of one component has some solubility in the other polymer, oil or plasticizer of the second component. This does not imply ideal molecular mixing but suggests that the level of molecular mixing is adequate to yield macroscopic properties expected of a single-phase material. Because of the high molecular weights of polymeric materials, a true homogeneous system, such as a mixture of water and alcohol, cannot be achieved. Such highly compatible systems provide substantially clear or transparent blends. For ease of expression, the terms "solution", "dissolve" and variants thereof refer to such highly compatible blends of the solid ethylene copolymer (ECP) in liquid monomers described herein. The term "substantially" means more than trivial; "substantially dissolved" means at least 1 to 99% of one component is dissolved in another component to form a solution or substantially a solution, such as the ECP disclosed herein being dissolved in a liquid molecule suitable for use as a latex monomer.

A second category of compatibility includes blends or dispersions that are not totally compatible on a molecular scale, but have sufficient molecular compatibility or molecular interaction to provide useful polymeric blend materials. Such an immiscible blend of a two-component system remains a two-phase system, and the two-phase nature can often be revealed using optical microcopy or electron microscopy. Because of the two-phase nature of an immiscible blend, the properties are often dictated by the major component. These blends usually are hazy, translucent or milky.

The term "suspension" refers to a relatively coarse, non-colloidal dispersion of droplets or particles in a liquid.

The term "latex" herein denotes a colloidal dispersion of polymer particles. The terms "latex", "latex polymer", and "emulsion polymer" are synonymous and used interchangeably herein. The product of the emulsion polymerization process described herein is a "water-based latex" or a "latex composition".

Ethylene copolymer aqueous dispersions have been used to modify latex binders, but have shown little improvement in binder properties. This may be because significant improvement of blend properties is found only when polymer components are well mixed above melting temperature, for example via extrusion compounding. An alternative is to prepare at least one of the polymeric materials in a latex composition by emulsion polymerization. Ethylene copolymers are difficult to produce via emulsion polymerization, due to the gaseous nature of ethylene. It has now surprisingly been found, however, that ethylene copolymers may be dissolved in a latex monomer prior to carrying out polymerization step. An aqueous emulsion of monomer/ethylene copolymer droplets is polymerized. The unique latex compositions or particle morphologies so produced lead to better latex film properties and better performance in water-based formulated products such as coatings and adhesives.

Accordingly, the monomer emulsions described herein are compositions in which water constitutes the continuous phase and a monomer or mixture of monomers containing one or more dissolved ethylene copolymers constitutes the discontinuous phase. Thus, these emulsions are of the oil-in-water type. The dispersed or suspended organic phase constitutes from about 10 to about 50 percent of the emulsion's total weight, and complementarily the continuous or aqueous phase constitutes about 50 to about 90 percent of emulsion's total weight. The organic phase, consisting essentially of monomer(s) and dissolved ethylene copolymer(s), is present as droplets having an average droplet diameter from about 10 nanometers to about 10 microns.

The term "mini-emulsion", as used herein, refers to a subset of emulsions in which the average monomer droplet size is not in excess of about 500 nanometers (0.5 micron), such as from about 10 nanometers to about 500 nanometers, preferably from about 80 to about 150 nanometers. This term is used to distinguish monomer mini-emulsions and mini-emulsion polymerization processes from conventional emulsion polymerization processes and conventional emulsions, in which droplets of about 10 nanometers to about 10 microns in diameter are dispersed in a continuous aqueous phase. When the distinction between a mini-emulsion and a conventional emulsion is not important, the generic term "emulsion" is used herein to refer to a dispersion or suspension of droplets of any size in a liquid medium.

Provided herein is a method to produce a latex composition that comprises an ethylene copolymer and one or more additional polymers. The latex composition may include both homopolymers and copolymers. The monomeric starting material is a monomer or mixture of one or more monomers. The monomer or monomers are ethylenically unsaturated organic compounds that are essentially insoluble in water, i.e., their solubility ranges from 0 to about 5 weight percent, preferably from 0 to about 3 weight percent. Water solubility is measured in deionized water and reported as a percentage based on the number of grams of dissolved monomer per 100 grams of water.

The first step of the method is to provide an ethylene copolymer of polar comonomers. Any polar copolymer that is capable of forming a copolymer with ethylene is suitable. The ethylene copolymer may be formed by direct or "in-line" copolymerization or by grafting. The ethylene copolymer may be a block copolymer, a random copolymer, or an imperfect copolymer having some degree of heterogeneity in the comonomer distribution along the polymer backbone. Preferably, the ethylene copolymers with polar comonomers comprise copolymerized units of ethylene and copolymerized units of one or more of: a vinyl ester such as vinyl acetate; an $\alpha,\beta$-unsaturated monocarboxylic acid or its derivative; an $\alpha,\beta$-unsaturated dicarboxylic acid or its derivative; an epoxide-containing monomer; wherein the ethylene copolymer contains copolymerized units of 2 to 80 weight % of the polar comonomer(s), based on the total weight of the ethylene copolymer. Complementarily, the ethylene copolymer comprises about 20 to about 98 wt % of copolymerized repeat units of ethylene.

The ethylene copolymer can be a dipolymer, a terpolymer, a tetrapolymer, or a copolymer of more than four comonomers. More than one ethylene copolymer may be used. Notable ethylene copolymers include those with a comonomer selected from vinyl esters, $\alpha,\beta$-unsaturated monocarboxylic acids, and $\alpha,\beta$-unsaturated monocarboxylic acid esters, wherein the ethylene copolymer contains at least 2 weight % of copolymerized units of the comonomer and a complementary amount of copolymerized ethylene residues, again based on the total weight of the ethylene copolymer.

The ethylene copolymer preferably has a melt flow rate, measured in accordance with ASTM D-1238 at 190° C. with 2.16 kg pressure, that ranges from a lower limit of about 0.1, about 0.3 or about 1 to an upper limit of about 30, about 100, about 200, about 500, about 1000, or about 1500 g/10 minutes, such as from about 0.1 to about 30 g/10 minutes, or from about 30 to about 100 g/10 minutes, or from about 30 to about 1500 g/10 minutes, or from about 30 to about 200 g/10 minutes, or from about 200 g/10 minutes to about 1500 g/10 minutes.

When the ethylene copolymer is an ethylene vinyl acetate copolymer, the amount of copolymerized vinyl acetate units can vary broadly from 2 to 50 weight % or more of the total weight of the ethylene copolymer. Preferably, the weight percentage of copolymerized vinyl acetate units is from 2 to 40 weight %, such as from 10 to 40 wt %. More preferably, the poly(ethylene-co-vinyl acetate) polymer comprises at least about 18 weight % of copolymerized repeat units derived from vinyl acetate, based on the total weight of the poly(ethylene-co-vinyl acetate) polymer, such as between 25 and 50 weight % of copolymerized repeat units derived from vinyl acetate.

Suitable ethylene vinyl acetate copolymers are commercially available from E. I. du Pont de Nemours and Company (DuPont) of Wilmington, Del. under the Elvax® trademark.

A mixture of two or more different ethylene/vinyl acetate copolymers can be used in place of a single copolymer, as long as the average values for the weight percentage of vinyl acetate comonomer units, based on the total weight of the copolymers, are within the range indicated above. Particularly useful properties may be obtained when two or more properly selected ethylene/vinyl acetate copolymers are used in the latex compositions.

Alternatively, the ethylene copolymer may be an ethylene alkyl acrylate or ethylene alkyl methacrylate copolymer. The terms "ethylene/alkyl (meth)acrylate copolymer" and "ethylene (meth)acrylate copolymer" are used interchangeably herein to refer to thermoplastic copolymers derived from the copolymerization of ethylene and at least one alkyl acrylate or alkyl methacrylate comonomer, wherein the alkyl group contains from 1 to 8 carbon atoms, preferably from 1 to 4 carbon atoms. Examples of suitable alkyl acrylates include, without limitation, methyl acrylate, ethyl acrylate and butyl acrylate. Examples of suitable alkyl methacrylates include methyl methacrylate, ethyl methacrylate and butyl methacrylate.

The relative amount of copolymerized alkyl (meth)acrylate comonomer in the ethylene/alkyl (meth)acrylate copolymer can vary broadly from about 2 weight % to about 45 weight % or more, based on the total weight of the ethylene copolymer. Notably, the level of copolymerized units of alkyl (meth)acrylate comonomer in the ethylene/alkyl (meth)acrylate copolymer is within the range of from 5 to 45 wt %, preferably from 5 to 35 weight %, from 5 to 30 wt %, still more preferably from 9 to 28 weight % or from 10 to 27 weight % of the total ethylene/(meth)acrylate copolymer, based on the weight of the copolymer. Methyl acrylate, the most polar alkyl acrylate comonomer, can be used to prepare an ethylene/methyl acrylate dipolymer. The methyl acrylate comonomer can be present in an amount of from 5 to 30, 9 to 25, or 9 to 24 weight %, based on the total weight of the ethylene copolymer. The amount of copolymerized ethylene is complementary to the amount of copolymerized alkyl (meth)acrylate(s) and other comonomers, if any, in the ethylene copolymer.

Also preferred are ethylene elastomers that may comprise, be produced from, or consist essentially of copolymerized units of ethylene, about 45 to about 80 weight %, or about 45 to about 75 weight %, or about 55 to about 80 weight %, or about 50 to about 70 weight %, or about 50 to about 80 weight % of copolymerized units of at least one alpha, beta-ethylenically unsaturated carboxylic acid ester, based on the total weight of the ethylene ester and optionally about 0.5 to about 10 weight %, about 1 to about 5 weight %, about 1.5 to about 5 weight %, about 1.5 to about 4 weight %, or about 1.5 to about 3 weight %, of copolymerized units of 2-butene-2,4-dioic acid or its derivative, wherein the derivative is an anhydride of the acid or a monoalkyl ester of the acid. Complementarily, the amount of copolymerized ethylene residues ranges from about 45 wt % to about 10 wt %, again based on the total weight of the ethylene ester.

A suitable ethylene elastomer dipolymer can comprise copolymerized ethylene residues and about 45 to about 80 weight %, 45 to about 75 weight %, or about 55 to about 80 weight %, or 50 to 70 weight %, or about 50 to about 80 weight % of a copolymerized (meth)acrylate or alkyl (meth) acrylate such as methyl acrylate. The alkyl group can have 1 to 8 carbons, preferably 1 to 4 carbons. The suitable dipolymer can have a number average molecular weight ($M_n$) above 20,000, above 30,000, above 40,000, or above 55,000 daltons, with an upper limit of about 100,000 or about 150,000 daltons; and a melt index from 2 to 20, or from 2 to 12 g/10 min, as measured by ASTM D1238 at 190° C. using a 2160 g load; and preferably a polydispersity from about 2 to about 10.

A suitable ethylene elastomer terpolymer can comprise copolymerized ethylene, a copolymerized alkyl (meth)acrylate, and a copolymerized 2-butene-2,4-dioic acid or its derivative. The suitable terpolymer may comprise about 45 to about 70 weight % of repeat units derived from alkyl (meth)acrylate. In addition, the suitable terpolymer may comprise about 0.5 to about 10 weight %, about 1 to about 5 weight %, about 1.5 to about 5 weight %, about 1.5 to about 4 weight %, or about 1.5 to about 3 weight % of repeat units derived from 2-butene-2,4-dioic acid or its derivative, in which the derivative is an anhydride of the acid or a monoalkyl ester of the acid. The alkyl group in the monoalkyl ester can have 1 to about 6 carbon atoms. Complementarily, the repeat units derived from ethylene can comprise the remainder up to 100 wt %, based on the total weight of the ethylene elastomer terpolymer. The terpolymer can have a number average molecular weight ($M_n$) above 20,000, above 40,000, or above 43,000 daltons, with an upper limit of about 100,000 or about 150,000 daltons; a melt index preferably from about 1 to about 30 g/10 min, as measured by ASTM D1238 at 190° C. using a 2160 g load; and preferably a polydispersity from about 2 to about 10.

A suitable ethylene elastomer terpolymer or a tetrapolymer can comprise copolymerized units of ethylene, a first alkyl (meth)acrylate, a second alkyl (meth)acrylate, and, optionally, a 2-butene-2,4-dioic acid or its derivative. The terpolymer or tetrapolymer may comprise about 10 to about 40 weight % or about 20 to about 30 weight % of repeat units derived from the first alkyl (meth)acrylate; and about 15 to about 65 weight % or about 35 to about 45 weight % of repeat units derived from the second alkyl (meth)acrylate. For example, the total amount of copolymerized alkyl (meth)acrylates may be about 45 to about 80 weight %, based on the total weight of the ethylene elastomer terpolymer or tetrapolymer. The first alkyl (meth)acrylate and the second alkyl (meth)acrylate are different although they can be selected from the same group. The first alkyl (meth) acrylate and the second alkyl (meth)acrylate can each independently have 1 to 4 carbons in the alkyl group. The ethylene elastomer terpolymer or tetrapolymer may include 0 to about 5 weight %, about 1 to 5 weight %, or about 2 to 5 weight % of repeat units derived from the 2-butene-2,4-dioic acid or its derivative. The amount of copolymerized ethylene in the terpolymer or tetrapolymer is complementary to the amounts of alkyl (meth)acrylate(s) and 2-butene-2,4-dioic acid or derivative(s). The copolymer can have a number average molecular weight ($M_n$) above 40,000, alternatively above 48,000, alternatively above 60,000 daltons; preferably a $M_n$ with an upper limit of about 100,000 or about 150,000 daltons; a melt index (MI) preferably about 3 to about 30 g/10 minutes, as measured by ASTM D1238 at 190° C. using a 2160 g load; and a polydispersity preferably from about 2 to about 12, or from 2.5 to 10.

In some embodiments, the ethylene elastomer or ethylene acrylic elastomer is cross-linkable to form a thermoset material. In these embodiments, the ethylene elastomer or ethylene acrylic elastomer is provided in a cross-linkable composition that further comprises or is produced from a curing agent; one or more additional polymers including thermosets such as epoxy resins, phenolic resins or vinyl ester resins subject to further curing; or thermoplastics such as polyamides. The cross-linkable composition is prevented from cross-linking until after the dispersion is formed, or until after the end-use of the dispersion is achieved, for example by maintaining processing temperatures below the activation temperature of any curing agent, or by preventing exposure to any initiator until cross-linking is desired.

Optionally, the ethylene elastomer or ethylene acrylic elastomer may further comprise one or more additives, of the types and in the amounts described above with respect to the ionomer composition. Filler, reinforcing fiber, fibrous structure of pulps, and combinations of two or more thereof are notable additives for the ethylene elastomer or ethylene acrylic elastomer.

Specific examples of suitable ethylene elastomers include ethylene methyl acrylate dipolymer, ethylene butyl acrylate dipolymer, ethylene methacrylate dipolymer, ethylene methyl methacrylate dipolymer, ethylene glycidyl methacrylate dipolymer, ethylene methyl acrylate butyl acrylate terpolymer, ethylene methyl acrylate glycidyl methacrylate terpolymer, ethylene butyl acrylate glycidyl methacrylate terpolymer, ethylene methyl acrylate butyl acrylate methyl hydrogen maleate tetrapolymer, ethylene methyl acrylate butyl acrylate ethyl hydrogen maleate tetrapolymer, ethylene methyl acrylate butyl acrylate propyl hydrogen maleate tetrapolymer, ethylene methyl acrylate butyl acrylate butyl hydrogen maleate tetrapolymer, and combinations of two or more thereof.

Suitable ethylene elastomers are commercially available from DuPont under the trademark Vamac® ethylene acrylic elastomers. Alternatively, methods for synthesizing suitable ethylene elastomers are set forth in U.S. patent application Ser. No. 15/078,290, filed on Mar. 23, 2016.

Mixtures of two or more ethylene/alkyl(meth)acrylate copolymers may also be used in place of a single ethylene copolymer, so long as the level of copolymerized units of alkyl (meth)acrylate(s) in each copolymer is within the above-described ranges. Particularly useful properties may be obtained when two properly selected ethylene/alkyl acrylate copolymers are used in blends. Suitable compositions include, without limitation, those in which the ethylene/alkyl acrylate component comprises two different ethylene/methyl acrylate copolymers. In particular, a single ethylene/methyl acrylate copolymer (E/MA) may be replaced with an equal amount of a properly selected mixture of two E/MA copolymers, where the mixture of E/MA copolymers has the same methyl acrylate content and the same melt index as the original, single E/MA copolymer.

Other suitable ethylene copolymers include terpolymers of ethylene copolymerized with one of vinyl acetate or alkyl (meth)acrylate and a third comonomer such as an epoxide-containing monomer or carbon monoxide.

The ethylene copolymers may also include an epoxide-containing monomer, preferably, a glycidyl-containing monomer. The glycidyl moiety may be represented by the following formula:

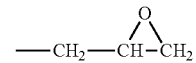

Suitable glycidyl-containing monomers include, without limitation, glycidyl esters of acrylic acid or methacrylic acid and glycidyl vinyl ether, and combinations thereof. Preferred are glycidyl methacrylate and glycidyl acrylate. The glycidyl-containing ethylene copolymer can comprise, consist essentially of, or consist of, repeat units derived from ethylene and an epoxide-containing comonomer. An example of a preferred ethylene copolymer is an ethylene glycidyl methacrylate copolymer (E/GMA). Glycidyl-containing ethylene copolymers and modified copolymers are well known in the polymer art and can readily be produced by the concurrent reaction of monomers in accordance with U.S. Pat. No. 4,070,532, for example.

The glycidyl comonomer may be incorporated into the glycidyl-containing ethylene copolymer in an amount of from about 0.3 to about 16 wt %, or about 5 to about 12 wt %, or about 5 to about 10 wt %. The comonomer can include glycidyl acrylate, glycidyl methacrylate, glycidyl butyl acrylate, glycidyl vinyl ether, or combinations of two or more thereof. These weight percentages are based on the total weight of the epoxy-functionalized ethylene copolymer, and the amount of copolymerized ethylene residues is complementary to the amount of copolymerized comonomer(s) containing glycidyl moieties and other comonomer(s), if any.

Some preferred epoxy-functionalized ethylene copolymers are represented by the formula E/X/Y, where E is the copolymer unit —($CH_2CH_2$)— derived from ethylene; X is the copolymer unit —($CH_2CR_1R_2$)—, wherein $R_1$ is hydrogen, methyl, or ethyl, and $R_2$ is carboalkoxy, acyloxy, or alkoxy of 1 to 10 carbon atoms (X for example is derived from alkyl acrylates, alkyl methacrylates, vinyl esters, and alkyl vinyl ethers); and Y is the copolymer unit —($CH_2CR_3R_4$)—, where $R_3$ is hydrogen or methyl and $R_4$ is carboglycidoxy or glycidoxy (Y for example is derived from glycidyl acrylate or glycidyl methacrylate). The epoxy-containing comonomer unit, Y, may also be derived from vinyl ethers of 1 to 10 carbon atoms (e.g., glycidyl vinyl ether) or mono-epoxy substituted di-olefins of 4 to 12 carbon atoms. The $R_4$ in the above formula includes an internal glycidyl moiety associated with a cycloalkyl monoxide structure, e.g., Y derived from vinyl cyclohexane monoxide.

For this preferred embodiment, useful weight percentages (based on total weight of copolymerized E, X, and Y in the copolymer) of the E/X/Y epoxy-functionalized ethylene copolymer units preferably are 0 to about 40 wt % (or when X is present, preferably about 20 to about 40 wt %, or about 25 to about 35 wt %) of X, about 0.3 to 15 wt % or 3 to 12 wt % or 5 to 9 wt % of Y, and the remainder E.

For example, an E/GMA is a dipolymer comprising repeat units derived from copolymerization of ethylene and glycidyl methacrylate (i.e., X is 0 weight % of the copolymer).

The epoxy-functionalized ethylene copolymer may optionally include repeat units derived from an ester of unsaturated carboxylic acid such as (meth)acrylate or $C_1$ to $C_8$ alkyl (meth)acrylate, or combinations of two or more thereof (an E/X/Y terpolymer as described above). Particularly useful (meth)acrylates include iso-butyl acrylate, n-butyl acrylate, iso-octyl acrylate, methyl acrylate or methyl methacrylate. Preferably, Y is selected from glycidyl acrylate or glycidyl methacrylate. Notable E/X/Y terpolymers comprise copolymerized units of ethylene, n-butyl acrylate and glycidyl methacrylate (an EnBAGMA copolymer) or copolymerized units of ethylene, methyl acrylate and glycidyl methacrylate (an EMAGMA copolymer).

The epoxy-functionalized ethylene copolymer can optionally include repeat units derived from a $C_2$ to $C_8$ carboxylic acid ester of an unsaturated alcohol such as vinyl alcohol, i.e., an E/X/Y terpolymer as described above, wherein the vinyl ester is X. A particularly useful vinyl ester is vinyl acetate. A notable E/X/Y terpolymer comprises copolymerized units of ethylene, vinyl acetate and glycidyl methacrylate (an EVAGMA copolymer).

Also preferably, the epoxy-containing monomers are incorporated into the epoxy-functionalized ethylene copolymer by the concurrent reaction of monomers (direct copolymerization) and not by a post-polymerization functionalization (grafting onto the reactant polymer or graft polymerization).

Another suitable ethylene copolymer includes one or more comonomers selected from the group consisting of carbon monoxide and an α,β-unsaturated dicarboxylic acid or its derivative, for example maleic acid, fumaric acid, itaconic acid, a $C_1$-$C_4$ alkyl monoester of maleic acid, a $C_1$-$C_4$ alkyl monoester of fumaric acid, a $C_1$-$C_4$ alkyl monoester of itaconic acid, acid anhydride, or combinations of two or more thereof. An example is a copolymer of ethylene and monoethyl maleic acid ester.

Terpolymers are also suitable. For example, ethylene, vinyl ester or an α,β-unsaturated ester, and maleic anhydride or carbon monoxide can be copolymerized to form terpolymers such as ethylene/methyl acrylate/maleic anhydride, ethylene/ethyl acrylate/maleic anhydride, ethylene butyl acrylate/maleic anhydride, ethylene/butyl acrylate/carbon monoxide (EBACO) or ethylene/vinyl acetate/carbon monoxide (EVACO). Suitable ethylene terpolymer resins are available from DuPont under the Elvaloy® trademark and from Arkema under the Lotader™ tradename.

Notable ethylene copolymers include, without limitation, ethylene methyl acrylate dipolymer, ethylene ethyl acrylate dipolymer, ethylene butyl acrylate dipolymer, ethylene methyl acrylate glycidyl methacrylate terpolymer, ethylene butyl acrylate glycidyl methacrylate terpolymer, ethylene butyl acrylate carbon monoxide terpolymer, ethylene vinyl acetate carbon monoxide terpolymer, or combinations of two or more thereof.

Ethylene acid copolymers comprising in-chain copolymerized units of ethylene and in-chain copolymerized units of one or more α,β-unsaturated $C_3$-$C_8$ monocarboxylic acids are also suitable.

The α,β-unsaturated $C_3$-$C_8$ monocarboxylic acid is preferably acrylic acid or methacrylic acid, and the monocarboxylic acid may be present in the copolymer in an amount of from about 3 to about 30 weight %, or about 3 to about 12 weight %, or about 12 to about 20 weight %, or about 4 to about 15 weight % of the copolymer, or about 15 to about 30 weight %, or about 15 to about 25 weight %, based on the total weight of the ethylene acid copolymer. In ethylene acid dipolymers, the weight of the copolymerized ethylene is complementary.

The ethylene acid copolymer may also optionally include other comonomers such as alkyl acrylates and alkyl methacrylates, wherein the alkyl groups have from 1 to 8 carbon atoms, such as methyl acrylate, ethyl acrylate and n-butyl acrylate, for example. These comonomers, when used, can be present in an amount of from 0.1 to about 30 wt %, based on the total weight of the ethylene acid copolymer, or about 3 to about 25%, such as from 3 to about 13 weight % or about 14 to about 25 weight %. The amount of copolymerized acid is as described above with respect to ethylene acid dipolymers, and the amount of copolymerized ethylene is complementary to the amounts of the other copolymerized monomers. The optional alkyl acrylates and alkyl methacrylates provide softer acid copolymers that after neutralization form softer ionomers.

Of note are ethylene acid dipolymers consisting essentially of copolymerized units of ethylene and copolymerized units of monocarboxylic acid (that is, the amount of alkyl acrylate or alkyl methacrylate is 0 weight %). Preferably the monocarboxylic acid is acrylic acid or methacrylic acid. Also of note are terpolymers consisting essentially of copolymerized units of ethylene, acrylic acid or methacrylic acid and an alkyl acrylate or alkyl methacrylate.

The acid copolymers may be obtained by high-pressure free radical polymerization, wherein the comonomers are directly copolymerized with ethylene by adding all comonomers simultaneously. This process provides copolymers with "in-chain" copolymerized units derived from the monomers, where the units are incorporated into the polymer backbone or chain. These copolymers are distinct from a graft copolymer, in which the acid comonomers are added to an existing polymer chain via a post-polymerization grafting reaction, often by a free radical reaction.

Suitable ethylene acid copolymers are commercially available from DuPont under the Nucrel® trademark.

The ethylene acid copolymers may also be at least partially neutralized to form ionomers, comprising salts of the carboxylic acid groups (carboxylate groups) and having cations as counterions. Any cation that is stable under processing conditions is suitable. Preferred are monovalent and divalent cations, including without limitation alkali metal cations, such as sodium, potassium or lithium; alkaline earth metal cations, such as zinc cations; and combinations of two or more monovalent and divalent cations. Monovalent cations are more preferred, and sodium cations are still more preferred.

Neutralization of an ethylene acid copolymer can be effected by making the ethylene acid copolymer and treating it with basic compound(s) comprising alkali metal, alkaline earth, or transition metal cations. The "parent acid copolymer" may be neutralized so that from about 10 to about 90%, preferably 30 to 90% of the available carboxylic acid groups in the copolymer are neutralized to form salts, preferably salts of at least one metal ion selected from lithium, sodium, potassium, magnesium, and zinc cations. For example, from about 10 to about 70% or about 30 to about 70% of the available carboxylic acid groups may be ionized by treatment with basic compound(s) (neutralization) comprising at least one metal ion selected from lithium, sodium, zinc, or magnesium.

Non-limiting, illustrative examples of ethylene acid copolymers that may be neutralized to form suitable ionomers include, without limitation, E/15MAA, E/19MAA, E/15AA, E/19AA, E/15MAA, E/19MAA, E/10MAA/4iBA, E/10MAA/9.8iBA, E/9MAA/23nBA, wherein E represents ethylene residues, MAA represents methacrylic acid residues, AA represents acrylic acid residues, iBA represents isobutyl acrylate residues, nBA represents n-butyl acrylate residues, and the numbers represent the weight % of comonomers present in the ethylene acid copolymer. The weight percentages are based on the total weight of the ethylene acid copolymer prior to neutralization, and the amount of copolymerized ethylene residues is complementary, i.e., it may be calculated by subtraction of the weight percentages of the other comonomers from 100 wt %.

Of note is an ionomer comprising a parent acid copolymer that comprises copolymerized units of ethylene and about 18 to about 30 weight % of copolymerized units of acrylic acid or methacrylic acid, based on the total weight of the parent acid copolymer, the parent acid copolymer having a melt flow rate (MFR) from about 200 to about 1000 g/10 min, wherein about 50% to about 70% of the carboxylic acid groups of the copolymer, based on the total carboxylic acid content of the parent acid copolymer as calculated for the non-neutralized parent acid copolymer, are neutralized to form carboxylic acid salts comprising as counterions sodium cations, potassium cations or mixtures thereof, and wherein the ionomer has a MFR from about 1 to about 20 g/10 min., each MFR measured according to ASTM D1238 at 190° C. with a 2160 g load. As described in greater detail in U.S. Pat. No. 8,907,022, this ionomer is readily dispersed in heated water.

Also of note are mixtures of suitable ionomers with other suitable ethylene copolymers described above, such as for example ethylene alkyl (meth) acrylate copolymers, which are also readily dispersed in heated water, as described in greater detail in U.S. Pat. No. 8,841,379.

Suitable ionomer resins are commercially available from DuPont under the Surlyn® trademark.

The ethylene copolymers can be produced by any suitable process, including processes that involve use of a tubular reactor or an autoclave. Copolymerization processes conducted in an autoclave may be continuous or batch processes. In one such process, described in general in U.S. Pat. No. 5,028,674, ethylene, the alkyl acrylate, and optionally a solvent such as methanol or a telogen such as propane to control the molecular weight, and an initiator are fed continuously into a stirred autoclave such as the type described in U.S. Pat. No. 2,897,183. Ethylene/alkyl acrylate copolymers produced using an autoclave process can be obtained commercially, for example from DuPont under the Elvaloy®AC and Vamac® trademarks; Optema™ from Exxon/Mobil Corp.; or from Lotryl™ from Arkema. Ethylene acid copolymers, such as Nucrel® resins, and their ionomers, such as Surlyn® resins, are also preferably synthesized in an autoclave. See, for example, U.S. Pat. No. 8,399,096.

As is generally recognized in the art, tubular reactor copolymerization techniques produce copolymers having a greater relative degree of heterogeneity along the polymer backbone (a more blocky distribution of comonomers), a reduction of long chain branching, and a higher melting point than copolymers produced at the same comonomer ratio and the same molecular weight in a high pressure stirred autoclave reactor. Tubular reactor produced ethylene/(meth)acrylate copolymers are commercially available from DuPont under the Elvaloy® AC trademark.

Finally, the ethylene copolymers may be modified by methods well known in the art, including chemical reaction by grafting with an unsaturated carboxylic acid or its derivatives, such as maleic anhydride or maleic acid. See, for example, U.S. Pat. Nos. 4,230,830; 5,744,250; and 6,299,985. Alternatively, suitable grafted ethylene copolymers are available commercially under the trademark Fusabond® from DuPont or under the tradenames Amplify™ GR and Amplify™ TV from the Dow Chemical Company of Midland, Mich.

The second step of the method is preparing a solution of the ethylene copolymer in at least one latex monomer. The ethylene copolymer (ECP) can be combined with, or added to, a latex monomer by any means known to one skilled in the art to produce a solution or substantially a solution. To facilitate the formation of a solution, the combination or addition can be mixed by, for example, mechanical means such as stirring, optionally with heating. For example, the formation of an ECP solution in a latex monomer can be carried out under atmospheric conditions, stirring for 10 to 30 minutes at 23 to 75° C., such as 23 to 50° C., and at a moderate rotary stirrer speed of 700 to 800 RPM. The resulting blend, a solution of ECP in a latex monomer, has the consistency of free-flowing oil at room temperature and at higher temperatures. The ethylene copolymer may be dissolved in the latex monomer in an amount of 0.5 to 40 weight %, or 6 to 25 weight %, or 6 to 10 weight %, to provide the solution. The amount of latex comonomer(s) is complementary, and the amounts are based on the total weight of the ECP solution.

In a third step, the resulting solution is mixed with water, usually under agitation, and the solution is thus dispersed in an aqueous medium to form a pre-emulsion. Optionally, one or more surfactants or one or more protective colloids may be added to stabilize the dispersion before, during or after the emulsion polymerization. Generally, the surfactant(s) are selected from the group consisting of anionic surfactants and nonionic surfactants. Examples of preferred surfactants include, but are not limited to, alkali alkylsulfate, ammonium alkylsulfate, alkylsulfonic acid, or fatty acid, oxyethylated alkylphenol, sulfosuccinates and derivatives, or any combination thereof. Preferably, the surfactant will provide droplet/particle stability, but result in minimal aqueous phase nucleation (micellar or homogeneous). Other surfactants that are useful to add to the aqueous composition are acetylenic diols and ethyloxylated acetylenic diols. Examples of acetylenic diols include, but are not limited to, Surfynol™ 104PG, Surfynol™ 440, Surfynol™ PSA336; all which are produced by Air Products. Polymerizable surfactants may be also used, for example, Hitenol™ BC-10, Hitenol™ HS 20 and Hitenol™ HS 10 produced by Montello.

Preferably, a single surfactant or a mixture of two or more different surfactants and protective colloids may be used, and these are selected from at least one of the following groups:
   i) an ethoxylated nonionic surfactant such as alkylphenol ethoxylate, alcohol ethoxylate having different degrees of ethoxylation and similar compounds
   ii) a nonionic sugar-based surfactant such as a nonethoxylated surfactant prepared with glycose or the like as polar part
   iii) an anionic surfactant such as alkyl sulphate, alkyl ether sulphate, alkyl phenol ether sulphate, dialkyl sulfosuccinate, hemisulfosuccinate, alkyl phosphate, alkyl ether phosphate, alkyl phenol phosphate, alkyl phenol ether phosphate and the like, and
   iv) a protective colloid such as a dispersed cellulose derivative, a polyvinyl alcohol latex, and the like.

The surfactant(s) or colloid(s) may be added to the water, to the latex solution of the ethylene copolymer, or portions of the surfactant(s) or colloid(s) can be added to the water and the latex solution prior to mixing. Alternatively, surfactant(s) or colloid(s) can be added once the mixing has begun. Preferably, the amount of the surfactant(s) or colloid(s) is about 3 to about 10 wt %, based on the total weight of the aqueous emulsion. Alternatively, the amount of the surfactant(s) or colloid(s) is about 3 to about 10 wt %, based on the total weight of the ethylene copolymer(s) and the latex monomer(s).

Following preparation of the aqueous emulsion, in the fourth step the latex monomers are polymerized in situ to form a "water-based latex" or a "latex composition." These two terms are synonymous and used interchangeably herein.

One or more of an initiator, a reducing agent, and a catalyst may be required to effect the polymerizarion. Suitable initiators include conventional initiators such as ammonium persulfate, ammonium carbonate, hydrogen peroxide, t-butyl hydroperoxide, ammonium or alkali sulfate, di-benzoyl peroxide, lauryl peroxide, di-tertiarybutylperoxide, 2,2-azobisisobutyronitrile, benzoyl peroxide, and the like, and mixtures of two or more of these initiators. Preferably, the emulsion, prior to polymerization, comprises a surfactant and an initiator.

Suitable reducing agents are those which increase the rate of polymerization and include, for example, sodium bisulfate, sodium hydrosulfite, sodium formaldehyde sulfoxylate, ascorbic acid, isoascorbic acid, and mixtures of two or more of these reducing agents.

Suitable catalysts are those compounds which promote decomposition of the polymerization initiator under the polymerization reaction conditions, thereby increasing the rate of polymerization. Suitable catalysts include transition metal compounds and driers. Examples of such catalysts include, but are not limited to, AQUACAT™, ferrous sulfate heptahydrate, ferrous chloride, cupric sulfate, cupric chloride, cobalt acetate, cobaltous sulfate, and mixtures of two or more of these catalysts.

As is set forth above, in a standard emulsion the dispersed phase is present as droplets having an average diameter from about 10 nanometers to about 10 microns. More preferably, however, the water-based latex is prepared under mini-emulsion polymerization conditions. A mini-emulsion is produced by subjecting the aqueous emulsion to a degree of shear that is sufficient to reduce the size of the suspended droplets of latex monomer solution to about 50 to about 500 nanometers in diameter. Any means known in the art may be used to subject the aqueous emulsion to sufficient shear. Generally, a high-shear mixing device, such as an overhead stirrer or a dispersator, is used.

The emulsion or the mini-emulsion may be polymerized as described in U.S. Pat. No. 5,686,518; and by Wang et al., in "Emulsion and Mini-emulsion Copolymerization of Acrylic Monomers in the Presence of Alkyd Resin," Journal of Applied Polymer Science, Vol. 60, pp. 2069-2076 (1996).

After polymerization, the viscosity of the water-based latex is less than 100 Pa·s, preferably from 0.2 to 70 Pa·s, at room temperature, as measured by Brookfield viscometry. Preferably, the water-based latex has a solids content of 30 to 95%, or about 40 to 95%, or about 30 to 70%, preferably 40 to 60% or 50 to 85%, by weight, based on the total weight of the water-based latex. The amount of water is complementary to the amount of polymer solids.

In general, the ethylene copolymer portion of the latex solids represents about 1 to about 30 weight %, preferably about 2 to about 10 weight % of the total solids of the water-based latex. Complementarily, the latex polymer of the hybrid latex represents about 70 to about 99 weight %, preferably about 90 to about 98 weight % of the total solids of the water-based latex.

Further provided herein is a water-based latex that is the emulsion polymerization product of at least one ethylene copolymer substantially dissolved in at least one latex monomer. A latex composition that is the product of polymerizing a mini-emulsion is preferred. The water-based latex is a stable emulsion of a "hybrid" latex resin that includes the ethylene copolymer(s) and the polymerization product(s) of the latex monomer(s). Moreover, the water-based latex exhibits good mechanical stability and good film-forming capability.

The water-based latex generally exists as polymer particles dispersed in water. The particles may be structured or unstructured. Structured particles may include, but are not limited to core/shell particles and gradient particles. The core/shell polymer particles may be prepared in many forms, including but not limited to, a multi-lobe form, a peanut shell, an acorn form, or a raspberry form. It is preferred in such particles that the core portion comprise about 20 to about 80 weight % of the total weight of the particle and that the shell portion comprise about 80 to about 20 weight % for the total weight of the particle. The average particle size of the hybrid latex may range from about 25 to about 500 nm. Preferred particle sizes range from about 50 to about 300 nm, more preferably from about 100 to about 300 nm or about 200 to 300 nm.

Further provided herein are formulated products comprising the water-based latex. The formulated products provide enhanced adhesive properties such as excellent shear strength, improved chemical/stain resistance and abrasion resistance. Suitable formulated products include, without limitation, paints; lacquers; varnishes; other coatings such as, for example, top coatings, protective coatings and decorative coatings; adhesives including caulking compositions and pressure sensitive adhesives; laminates; and the like. Pressure sensitive adhesives (PSA) are used in a variety of applications, including tapes, labels, stickers, decals, decorative vinyls, laminates, and wall coverings, for example.

The formulated products also include one or more additives known in the art for use in formulations that are based on aqueous latices, including, but not limited to, plasticizers, processing aids, flow enhancing additives, lubricants, defoamers, wetting agents, dispersing agents, thickeners, fillers including mineral fillers, colorants, pigments, dyes, flame retardants, impact modifiers, nucleating agents to increase crystallinity, antiblocking agents such as silica or silicones, thermal stabilizers, UV absorbers, UV stabilizers, dispersants, surfactants, chelating agents, coupling agents, solvents, rheology modifiers, curing agents or cross-linking agents, initiators, primers, tackifiers or tackifying resins, other dispersions, coalescing aids, wetting aids, neutralizing agents, preservatives, and the like. Further examples of such additives and of emulsion polymerization methodology are found in U.S. Pat. No. 5,371,148.

More specifically, the formulated products may incorporate an effective amount of a thermal stabilizer. Any thermal stabilizer known in the art is suitable. The formulations may incorporate from 0.1 to about 10 weight %, from 0.1 to about 5 weight %, or from 0.1 to about 1 weight % of thermal stabilizers, based on the total weight of the composition.

The formulated products may further comprise additives that effectively reduce the melt flow rate of the resin, for example by cross-linking, to the limit of producing compositions that are incapable of forming films when heated or when formulated with solvent. The use of such additives may increase the upper end use temperature of articles comprising the compositions by up to about 20° C. to 70° C. In addition, articles produced with coatings comprising low melt-flow polymers may be fire resistant, because these polymers have a reduced tendency to melt or flow. Thus, they tend not to serve as additional fuel for a fire.

The latex polymers described herein can be cured via a plurality of known curing mechanisms, including, without limitation:
  a) Oxidative curing by unsaturated fatty acids, optionally in combination with other unsaturation such as allyl, acrylate and vinyl.
  b) Radiation-induced radical curing (unsaturation), for instance UV and electron-beam curing.
  c) Peroxide-induced radical curing (unsaturation).
  d) Isocyanate+OH (blocked or unblocked isocyanate).
  e) Amino resin+OH (temperature or catalytic curing).
  f) Acetal+OH.
  g) Epoxy curing.
  h) Acetoacetate curing.

Organic peroxides are preferred melt flow reducing additives. Preferably, the organic peroxide(s) decompose at a temperature of about 100° C. or higher to generate radicals. More preferably, the organic peroxide(s) have a decomposition temperature which affords a half life of 10 hours at about 70° C. or higher, to provide improved stability for blending operations. Typically, the organic peroxide(s) will be added at a level of between about 0.01 to about 10 weight %, based on the total weight of the latex polymer in the formulated product. One or more initiators, such as dibutyltin dilaurate, may be used in conjunction with the curing agent(s). Typically, initiators are added at a level of from about 0.01 weight % to about 0.05 weight % based on the total weight of the latex polymer in the formulated product. In addition, one or more inhibitors, such as hydroquinone, hydroquinone monomethyl ether, p-benzoquinone, and methylhydro-quinone, may be added for the purpose of controlling the cross-linking reaction and the stability of the cured latex polymer. Typically, the inhibitor(s) are added at a level of less than about 5 weight %, based on the total weight of the latex polymer in the formulated product.

Suitable tackifiers are those that yield the properties desired in the formulated product(s), including, without limitation, hydrocarbon resins, synthetic polyterpenes, rosin esters, rosin derivatives, rosin esters, natural terpenes, and the like. More particularly, useful tackifying resins include, but are not limited to, (1) natural and modified rosins and the hydrogenated derivatives thereof, such as, for example, gum rosin, wood rosin, tall-oil rosin, distilled rosin, hydrogenated rosin, dimerized rosin, polymerized rosin, the glycerol ester of rosin, the glycerol ester of hydrogenated rosin, the glycerol ester of polymerized rosin, and the pentaerythritol ester of hydrogenated rosin; (2) glycerol and pentaerythritol esters of natural and modified rosins and the hydrogenated derivatives thereof, such as, for example, the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) polyterpene resins and the hydrogenated derivatives thereof, having a softening point, as determined by ASTM Method E28-58T, of from about 80° C. to 150° C.; the latter polyterpene resins generally result from the polymerization of terpene hydrocarbons, such as the bicyclic monoterpene known as pinene, in the presence of Friedel-Crafts catalysts at moderately low temperatures; also included are the hydrogenated polyterpene resins; (4) phenolic modified terpene resins and the hydrogenated derivatives thereof, such as, for example, the resin product resulting from the condensation, in an acidic medium, of a bicyclic terpene and a phenol; (5) aliphatic petroleum hydrocarbon resins and the hydrogenated derivatives thereof, having a Ball and Ring softening point of from about 70° C. to 135° C.; the latter resins resulting from the polymerization of monomers consisting of primarily olefins and diolefins; also included are the hydrogenated aliphatic petroleum hydrocarbon resins; (6) aromatic hydrocarbon resins and the hydrogenated derivatives thereof include, for example, hydrocarbon resins derived from at least one alkyl aromatic monomer, such as for example, styrene, alpha-methyl styrene and vinyl toluene and the hydrogenated derivatives thereof; the alkyl aromatic monomers can be obtained from petroleum distillate fractions or from non-petroleum feedstocks, such as, for example, feedstocks produced from phenol conversion processes; (7) alicyclic petroleum hydrocarbon resins and the hydrogenated derivatives thereof; and combinations of two or more tackifying resins.

The tackifying resin(s) are added subsequently to the emulsion or mini-emulsion polymerization. Examples of tackifying resins that can be post-added to the resins of the invention are described in U.S. Pat. Nos. 4,526,577; 4,460,728; and 4,411,954.

Plasticizers are a known class of materials, sometimes called "elastomer plasticizing oils." A liquid plasticizer is an additive that increases the plasticity or fluidity of a material. They include paraffinic and aromatic hydrocarbons, mixtures thereof and esters of aliphatic and aromatic acids. See, for example, U.S. Pat. No. 2,551,600.

Suitable liquid plasticizers include carboxylate esters such as, but not limited to, dicarboxylic or tricarboxylic ester-based plasticizers, such as bis(2-ethylhexyl) phthalate (DEHP), di-octyl phthalate (DOP), diisononyl phthalate (DINP), and diisodecyl phthalate (DIDP). Liquid plasticizers also include acetic acid esters of monoglycerides made from castor oil; or other nonphthalate plasticizers for PVC including trimellitates such as tris(2-ethylhexyl) trimellitate, adipates such as bis(2-ethylhexyl) adipate, benzoates such as 1,5-pentanediol dibenzoate, adipic acid polyesters, polyetheresters, epoxy esters or maleates. A preferred plasticizer for use in the formulated products is dioctyl phthalate.

Alternatively, the plasticizer may be a flux oil. Flux oils encompass many types of non-volatile oils used to modify polymers and are the final products in crude oil distillation. They can be aromatic, paraffinic or naphthenic (e.g., Sonoco offers 19 different flux oils such as Hydrolene®). They can also be any renewably-produced vegetable or bio-oil.

Any solvent known in the art can be utilized, based on the desired properties of the formulated product. Examples of useful solvents and coalescing aids are well known and include but are not limited to ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, TEXANOL™ ester alcohol (2,2,4-trimethylpentanediol monoisobutyrate (Eastman Chemical Company), and the like. Such solvents and coalescing aids may also include reactive solvents and coalescing aids such as diallyl phthalate, SANTOLINK™ XI-100 polyglycidyl allyl ether from Monsanto, and others as described in U.S. Pat. Nos. 5,349,026 and 5,371,148.

Stabilizers are a known class of materials, sometimes called antioxidants, and include, but are not limited to, hindered phenols, high aromatic secondary amines and phosphites. Mixtures of two or more such materials may be used in the water-based latex and in the formulated products.

Preferred stabilizers for use in the invention are "Wingstay L", which is believed to be a dispersion of a hindered phenol in 50% water supplied by Goodyear and "BNX-1000", available from Mayzo Inc., which is believed to be a mixture of hindered amines, hindered phenols and phosphites dispersed in a fatty acid epoxy resin. Examples of other commercially available materials of this class include "Irganox 565 or 1010 or 1330" (Ciba-Geigy Corp.), "Ethanox 330" (Ethyl Corp.), "Ionol" (Shell Chemical), "Polygard HR" & "Naugard 445" (Uniroyal Co.) and "BorgWarner 626" or trinonyl pyrophosphate [TNPP] (Chemical Additive Div., G E Co.). A particularly useful stabilizer, designated CACS, is believed to consist of a mixture of the following ingredients in the stated percentages by weight, namely, hindered phenol 20%, epoxy fatty acid 50%, trinonyl phenyl phosphite 25% and hindered amine 5%.

Any neutralizing agent known in the art is suitable, provided that it does not destabilize the latex composition or the formulated product. Bases are preferred neutralizing agents when the emulsion includes an anionic surfactant. See, for example, Yamak, Hale Berber, "Emulsion Polymerization: Effects of Polymerization Variables on the Properties of Vinyl Acetate Based Emulsion Polymers," pages 35 to 72, and in particular page 41, which is Chapter 2 of Yilmaz, Faris, Ed., "Polymer Science," ISBN 978-953-51-0941-9, 256 pages, Publisher: InTech, Chapters published Jan. 23, 2013 under CC BY 3.0 license, DOI: 10.5772/2749, available at http://cdn.intechopen.com/pdfs-wm/42097.pdf (last viewed on Mar. 26, 2016). Accordingly, preferred neutralizing agents include, but are not limited to, alkali hydroxides and amines. Examples of alkali hydroxides include sodium hydroxide, potassium hydroxide, and lithium hydroxide. Examples of amines include ethanolamine, triethylamine, and dimethylethanolamine. Other suitable neutralizing agents are ammonium salts.

An adhesive comprising the water-based latex is a preferred formulated product that may be prepared by techniques known in the art, e.g., as described in U.S. Pat. Nos. 4,879,333 and 5,728,759. For example, a water-based latex, or an adhesive formulation comprising the water-based latex, may be coated onto a substrate using techniques known in the art (e.g., roll-coating, curtain coating, gravure printing, slot die coating) to produce an adhesive layer or a coated substrate. The substrate may be any common substrate, such as, for example, paper, cardboard, polyolefin films such as polyethylene and polypropylene, metals such as aluminum and steel, glass, urethane elastomers and primed (painted) substrates, and polyesters, including, but not limited to, terephthalate-based polyesters such as polyethylene terephthalate. The adhesive or coating composition can be dried to form a film, or it can be cured at room temperature (ambient cure), at elevated temperatures (thermal cure), or cured by radiation, depending on the specific curing system that is included in the water-based latex or in the formulated adhesive. Preferred adhesives include pressure sensitive adhesives, which may be used in articles of manufacture such as tapes, labels, stickers, decals, decorative vinyls, laminates, and wall coverings.

The water-based latex and the formulated products such as the adhesive formulations described herein offer the further advantage of being water-based. Therefore, they include significantly less solvent than typical solvent-based adhesives, for example less than 25 weight % to 1 weight % or less, or zero volatile organic compound (VOC) content, based on the total weight of the water-based latex or the formulated adhesive.

Further provided are articles that comprise or are produced from the water-based latex or the formulated products. For example, one article is an adhesive described above coated on a substrate, and another article is a paint described above coated on a substrate. Other articles include the water-based latex or a formulated product coated on paper, and carpet backing that comprises or is produced from the water-based latex or a formulated product.

The synthetic methods, water-based lattices, formulated products and articles described herein provide advantages over conventional processes and materials including, but not limited to, environmental friendliness and good mechanical stability, without sacrificing other important adhesive properties such as peel strength, loop tack, etc. It is further advantageous to combine ethylene copolymers and latex monomers prior to polymerizing the latex monomers, because the additional step of dispersing an ethylene copolymer in the latex after polymerization is not required. The invention is further advantageous when mini-emulsion polymerization is used, avoiding the process difficulties that occur when acrylic and/or vinyl monomers are polymerized using conventional emulsion polymerization processes. Finally, the surfactants normally required to disperse the ethylene copolymer in water may not be necessary.

The following examples are provided to describe the invention in further detail. These examples, which set forth specific embodiments and a preferred mode presently contemplated for carrying out the invention, are intended to illustrate and not to limit the invention.

EXAMPLES

The compositions of the ethylene copolymers used in the process are set forth in Table 1. Melt Index (MI) was measured according to ASTM D1238 (190° C. and 2.16 kg load). The latex monomers used in the process are listed in Table 2.

TABLE 1

| Ethylene Copolymer | | | | |
|---|---|---|---|---|
| Polymer | Vinyl acetate | CO | n-Butyl acrylate | MI (190° C./2.16 kg) (g/10 min) |
| EVACO | 28.5 | 9 | 0 | 35 |
| EnBACO | 0 | 10 | 27 | 100 |

TABLE 2

| Monomer | |
|---|---|
| Methyl Methacrylate | MMA |
| Ethyl Acrylate | EA |
| Vinyl Acetate | VA |
| Acrylic Acid | AA |
| Styrene | ST |
| Monomer Blend | EA/MMA/ST/AA (62/25/12/1) |

Materials and Sources
Methyl Methacrylate (99%) was obtained from Sigma Aldrich, Product code M55909
Ethyl Acrylate (99%) was obtained from Sigma Aldrich, Product Code E9706
Acrylic Acid (99%) was obtained from Sigma Aldrich, Product Code 147230
Styrene (>99%) was obtained from Sigma Aldrich, Product Code S4972
Hitenol AR-1025 was obtained from Montello Inc.
Phospholan PS 131 was obtained from Akzo Nobel
Ammonium Persulfate (98%) was obtained from Sigma Aldrich, product code 215589
Ammonia Hydroxide (30%) was obtained from Sigma Aldrich, Product Code 320145
Natrosol 250 HHR was obtained from Ashland
BYK 25 and BYK 156 were obtained from BYK Additives and Instrument Co.
Diethylene Glycol (99%) was obtained from Sigma Aldrich, Porduct code H26456
Triton CF-10 and Triton X100 were obtained from Dow Chemicals
Ti-Pure R960 was obtained from DuPont
Atomite (CaCO3) was obtained from Imery Carbonates
Control Latex Preparation Procedure:

A 500-ml three necked round bottom glass flask (reactor) was equipped with a reflux condenser, mechanical stirrer, dropping funnel, nitrogen gas inlet and a thermocouple connected to a temperature regulator. A mixture of latex monomers including ethyl acrylate (141 g), styrene (24 g), methyl methacrylate (33 g) and acrylic acid (2 g) were mixed in a 500 ml beaker using a magnetic stirrer for a period of 5 minutes.

In a separate beaker, deionized water (16 g), Hitenol AR 1025 (16 g) and Phospholan OS 131 (4 g) were mixed for five minutes and added to the monomer mixture to form a pre-emulsion. The pre-emulsion was stirred for one hour. In a second separate beaker, ammonium persulfate (1.6 g) was dissolved in deionized water (28 g) to form an initiator solution.

Additional aliquots of deionized water (80 g) and of Phospholan PS131 (4 g) were added into the reactor. The temperature of the mixture in the reactor was raised to 80° C. The pre-emulsion along with the initiator solution was introduced to the reactor via dropping funnel over a three hour period. The reaction mixture exhibited a milky, stable appearance during the addition.

Ammonium persulfate (0.4 g) was dissolved in deionized water (6 g). This solution was added to the reactor. The temperature of the reaction mixture was held for 1 hour at 80° C. After the holding stage, the heating was removed from the flask and the reaction mixture was cooled under ambient (room temperature) conditions. When the temperature of the reaction mixture reached 40° C., its pH was adjusted to 8 by adding ammonium hydroxide (30% aq).

Latex Containing Ethylene Copolymer Preparation Procedure:

A 500 ml three necked round bottom glass flask (reactor) was equipped with a reflux condenser, mechanical stirrer, dropping funnel, nitrogen gas inlet and a thermocouple connected to a temperature regulator. The same mixture of latex monomers used in the control latex were mixed in a 500 ml beaker with EVACO (20 g) or EBACO (20 g) and heated at 35 to 40° C. with magnetic stirring for one hour until a clear homogeneous solution was obtained.

In a separate beaker, deionized water (16 g), Hitenol AR 1025 (16 g) and Phospholan OS 131 (4 g) were mixed for five minutes and added to the monomer mixture to form a pre-emulsion. The pre-emulsion was stirred for one hour. In a second separate beaker, ammonium persulfate (1.6 g) was dissolved in deionized water (28 g) to form an initiator solution.

Additional aliquots of deionized water (80 g) and of Phospholan PS131 (4 g) were added into the reactor. The temperature of the mixture in the reactor was raised to 80° C. The pre-emulsion along with the initiator solution was introduced to the reactor via dropping funnel over a three hour period. The reaction mixture exhibited a milky, stable appearance during the addition.

Ammonium persulfate (0.4 g) was dissolved in deionized water (6 g). This solution was added to the reactor. The temperature of the reaction mixture was held for 1 hour at 80° C. After the holding stage, the heating was removed from the flask and the reaction mixture was cooled under ambient (room temperature) conditions. When the temperature of the reaction mixture reached 40° C., its pH was adjusted to 8 by adding ammonium hydroxide (30% aq).

Latex Properties—Evaluation Results

Properties of the control latex and the latices containing EVACO and EBACO were evaluated. Tg of the latices were checked using DSC technique. A minimum film forming temperature (MFFT) bar was used to check latex MFFT. Latex particle size was analyzed using a 90 Plus Particle Sizer produced by Brookhaven Instruments Corporation. Texanol from Eastman Chemicals was used as a coalescing agent. The residual waste or "gel" was filtered from the latex using a 1 mm metallic mesh sieve.

In addition, the coalescent Texanol and the surfactants Triton X100 (Dow Chemicals), Dowfax 2A1 (Dow Chemicals), Hitenol KH-05, KH-10 (Montello Inc), Hitenol AR-10 and AR-25 (Montello Inc) and Phospholan PS131 (Akzo Nobel) were tested for compatibility with the latex compositions. An aliquot of coalescent or surfactant was mixed with a portion of each latex (5 wt % on solid basis). The mixtures were visually checked for any signs of instability, such as aggregate or agglomerate formation. The mixture was ranked compatible if the mixture exhibited a homogeneous consistency without aggregation or formation of agglomerates.

The results of these measurements are set forth in Table 3.

TABLE 3

| Batch ID | Tg ° C. DSC ASTM D3418 | MFFT, ° C. ASTM D2354 without coalescent | MFFT, ° C. ASTM D2354 with 5% Texanol | Particle size (nm) | w/w % residual waste | Freeze thaw stability 17 h −15° C./ 7 h −20° C. 6 cycles | Compatibility with Coalescent and surfactants |
|---|---|---|---|---|---|---|---|
| 10 wt % EVACO | 36.7 | 27 | 13 | 224 | 0.20 | Failure at 4 cycles (high viscosity, hard sediment | Compatible |
| 10 wt % EBACO | 30.5 | 21 | 10 | 275 | 0.75 | Without observable changes | Compatible |
| Control | 29 | 19 | 8 | 180 | 0.30 | Without observable changes | Compatible |

TABLE 4

| Ingredient | % | |
|---|---|---|
| DI Water | 21.67 | Group 1 |
| Natrosol 250 HHR | 0.48 | |
| Ammonia | 0.13 | |
| BYK-25 | 0.09 | |
| Diethylene Glycol | 1.91 | Group 2 |
| BYK-156 | 0.64 | |
| Triton CF-10 | 0.64 | Group 3 |
| Ti-Pure R960 | 10.20 | |
| Calcium Carbonate | 53.54 | |
| Triton X-100 | 0.64 | Group 4 |
| Texanol | 0.64 | |
| Ammonia | 0.38 | |
| BYK-25 | 0.13 | |
| DI Water | 8.92 | |
| Total | 100.00 | |

Paint Formulation

The pigment paste was combined with the latex and further Texanol coalescing agent in a mixing vessel, using a standard laboratory 3-blade stirrer with an average speed of 120 rpm for 15 to 60 min (depending on the batch size). The paint composition is set forth in Table 5. The quality of the paint's dispersion was evaluated (6 Hegman).

TABLE 5

| Ingredient | % |
|---|---|
| Pigment paste | 39.2 |
| Latex (50% solid content) | 59.6 |
| Texanol | 1.2 |

Latex Paint Preparation

Semi-gloss latex paints were prepared by mixing each latex with a pigment paste. The lattices were filtered through a series of 1 mm size metal sieves prior to mixing with the pigment paste.

Pigment Paste Formulation

A pigment paste was prepared by mixing the ingredients set forth in Table 4 in groups using a high speed Indco dispersator at disc speed of 2400 rpm. Once the four groups were individually mixed, they were combined in order by group number, still using a high speed Indco dispersator at disc speed of 2400 rpm. The pigment paste was filtered through a 1 mm metallic mesh sieve, and the quality of its dispersion was evaluated (6 Hegman).

Coating Tests

Various substrates, such as sanded wood panels, Leneta charts and aluminum Q-panels, were used for coating property tests. A commercial architectural primer, Kilz Premium from Masterchem Inc., was applied to the sanded wood panel for checking adhesion to primer. The primer was dried for at least 16 hours at room temperature and 60% relative humidity (RH) before the experimental latex paint was applied using a brush. Draw-down bars were used to apply the paint to Leneta charts and aluminum Q-panels. The physical properties were measured after the coatings were dried for at least 24 hours at room temperature at 60% RH. Adhesion to the primer was evaluated according to ASTM D3359 after the coating was dried at room temperature for 15 days at 60% RH.

A Scotch-Brite Heavy Duty Scour Pad obtained from 3M was used for the scrub test. First, aluminum Q-panels were cleaned with isopropanol. Latex paint was applied to the clean Q-panels using a 30-mil draw down bar. The coated panels were then dried at room temperature and 60% RH for 4 days and for 2 days at 40° C. Scrub cycles (back and forth=1 cycle; 600 cycles=1200 strokes) were applied manually to the coated panel. Adhesion loss, reduction of thickness and mechanical damages were evaluated visually. In addition, several of the cleaned, coated and dried coated aluminum Q-panels were mounted onto a variable diameter (conical) mandrel and evaluated according to ASTM D522.

TABLE 6

| Property | Batch | | |
|---|---|---|---|
| | 10% EVACO | 10% EBACO | Lab batch |
| Sheen (85°) | 20 | 17 | 36 |
| ASTM E284/Appearance 30 mil, on Aluminum panel | Flat | Flat | Semi-gloss |
| Dry time, dry to touch, (min) ASTM D1640 Draw down bar: 20 mils to wood Controlled room conditions | 20 | 32 | 24 |
| Brushability of dry film | Brush marks | The best brushability amongst all samples | Heavy brush marks |
| Scrub resistance, cycles with Scotch Brite sponge Aluminum panel 30 mil/600 cycles, 4 days at room temp, 2 days at 40° C. | Passed | Passed | Marginal |
| Color acceptance with red concentrated paste Rub-out test | Excellent without separation or migration | Excellent without separation or migration | Excellent without separation or migration |
| Freeze thaw stability 17 h at −15° C./ 7 h at 20° C. 2 cycles | It exhibited a clear top layer separation of around 3 mm height after $1^{st}$ cycle | It exhibited a clear top layer separation of around 1 mm height after $2^{nd}$ cycle | Negligible top layer separation of less than 0.5 mm height after $2^{nd}$ cycle |
| Adhesion to primer, two passes with brush, after 15 days ASTMD3359 | 5B | 5B | 5B |
| Conical mandrel test 30 mil, cured film, ASTM D522 | Cracking from 1 inch cone diameter | Without cracking | Without cracking |

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A method for preparing a latex composition, said method comprising the steps of:
   (1) providing at least one ethylene terpolymer comprising copolymerized units of ethylene and copolymerized units of at least two polar comonomers, wherein each polar comonomer individually comprises one or more monomers selected from the group consisting of a vinyl ester; an α,β-unsaturated monocarboxylic acid or its derivative; an α,β-unsaturated dicarboxylic acid or its derivative; an epoxide-containing monomer; and carbon monoxide;
   (2) mixing the ethylene terpolymer(s) with one or more latex monomers selected from the group consisting of:
      (i) a carboxyl functional monomer;
      (ii) a hydroxyl functional monomer;
      (iii) an epoxy functional monomer;
      (iv) an amino functional monomer;
      (v) an alkyl acrylate or an alkyl methacrylate;
      (vi) a polymerizable aromatic monomer;
      (vii) a vinyl monomer; and
      (viii) a diene monomer;
   to form a solution of the ethylene terpolymer(s) in the latex monomer(s);
   (3) mixing the solution with water;
   (4) optionally adding a surfactant or protectant colloid to the combined solution and water;
   (5) agitating the mixture of the water and the solution to form an aqueous emulsion; and
   (6) polymerizing the latex monomer(s) in the aqueous emulsion to form the latex composition, said latex composition comprising a latex polymer that is the product of polymerizing the latex monomer(s).

2. The method of claim 1, wherein the latex polymer is a copolymer.

3. The method of claim 2, wherein the latex monomer comprises copolymerized residues of one or more monomers selected from the group consisting of a vinyl ester, an alkyl acrylate, an alkyl methacrylate, styrene, and optionally a functional monomer selected from the group consisting of acrylic acid, methacrylic acid, acrylamide, dimethylaminoethyl methacrylate, glycidyl methacrylate, and allyl methacrylate.

4. The method of claim 3, wherein the ethylene terpolymer comprises copolymerized units of ethylene and at least 2 wt % of copolymerized units of a comonomer selected from vinyl esters and α,β-unsaturated monocarboxylic acid esters.

5. The method of claim 4, wherein the ethylene terpolymer comprises one or more of ethylene methyl acrylate glycidyl methacrylate terpolymer, ethylene butyl acrylate glycidyl methacrylate terpolymer, ethylene butyl acrylate carbon monoxide terpolymer, ethylene vinyl acetate carbon monoxide terpolymer, ethylene/methyl acrylate/maleic anhydride terpolymer, ethylene/ethyl acrylate/maleic anhydride terpolymer, ethylene/butyl acrylate/maleic anhydride terpolymer, ethylene/butyl acrylate/glycidyl methacrylate terpolymer, ethylene/butyl acrylate/carbon monoxide terpolymer or ethylene/vinyl acetate/carbon monoxide terpolymer.

6. The method of claim 5 wherein the mixture of water and the solution of the ethylene terpolymer in the latex monomer comprises droplets of the solution of the ethylene terpolymer in the latex monomer of about 1 to 10 microns in diameter dispersed in a continuous aqueous phase.

7. A latex composition prepared by the method of claim 1 or 6.

8. An article comprising or produced from the water-based latex of claim 7.

9. The method of claim 1, wherein mixing the ethylene terpolymer(s) with one or more latex monomers comprises mixing the ethylene terpolymer(s) with the one or more latex monomers under atmospheric conditions at a temperature of from 23° C. to 75° C. to form a solution of the ethylene terpolymer(s) substantially dissolved in the one or more latex monomers.

* * * * *